US006528099B1

United States Patent
Garti et al.

(10) Patent No.: US 6,528,099 B1
(45) Date of Patent: Mar. 4, 2003

(54) METHOD FOR SELECTIVELY OBTAINING ANTIOXIDANT RICH EXTRACTS FROM CITRUS FRUITS

(75) Inventors: Nisim Garti, Jerusalem (IL); Gilad Agmon, Ramat Hasharon (IL); Eli Pintus, Maale Adumim (IL)

(73) Assignee: Adumim Chemicals Ltd., Mishor Adumim (IL)

(*) Notice: Subject to any disclaimer, the term of this patent is extended or adjusted under 35 U.S.C. 154(b) by 0 days.

(21) Appl. No.: 09/856,633

(22) PCT Filed: Nov. 28, 1999

(86) PCT No.: PCT/IL99/00641
§ 371 (c)(1),
(2), (4) Date: Jul. 24, 2001

(87) PCT Pub. No.: WO00/32062
PCT Pub. Date: Jun. 8, 2000

(30) Foreign Application Priority Data

Dec. 2, 1998 (IL) .................................................. 127371

(51) Int. Cl.[7] .......................... A61K 35/78; A61K 31/35
(52) U.S. Cl. ....................... 424/736; 424/744; 424/725; 514/27; 514/449
(58) Field of Search .................... 514/27, 449; 424/736, 424/744, 725

(56) References Cited

U.S. PATENT DOCUMENTS

| | | | | |
|---|---|---|---|---|
| 2,421,062 A | * | 5/1947 | Higby | .................... 260/210 |
| 2,421,063 A | * | 5/1947 | Baier | .................... 260/210 |
| 6,350,477 B1 | * | 2/2002 | Yamamoto et al. | .......... 424/736 |

FOREIGN PATENT DOCUMENTS

| | | | |
|---|---|---|---|
| DE | 25 25 590 A | | 12/1976 |
| EP | 0 657 169 A | | 6/1995 |
| EP | 657169 | * | 6/1995 |
| JP | 09048969 | * | 2/1997 |

OTHER PUBLICATIONS

Tan et al., "Extraction of hesperidin from fresh citrus peel." Abstract: Chongquing Daxue Xuebao (1991), 14(6), 119–20.*
Patent Abstract of Japan, vol. 1997, No. 4; Apr. 30, 1997.
Patent Abstract of Japan, vol. 12, No. 438; Nov. 17, 1988.

* cited by examiner

*Primary Examiner*—Samuel Barts
*Assistant Examiner*—Devesh Khare
(74) *Attorney, Agent, or Firm*—Lowe Hauptman Gilman & Berner, LLP

(57) ABSTRACT

A method for selectively obtaining antioxidant rich aqueous extracts from the cells, frit, core, and peels of citrus fruits, comprises a) employing water treatment and solids extraction of the citrus fruit; b) employing separation technology and/or membrane technology on the extracts, resulting in a serum; c) submitting the serum to an adsorption process on resin, and d) eluting the adsorbed antioxidant compounds from the resin by solvents, preferably edible solvents such as ethanol or ethyl acetate, and collecting the solvent. For selectivity purposes, the solvent may be collected fractionwise. The collected solvent fractions may be further evaporated to obtain dry phenolic compounds.

22 Claims, 6 Drawing Sheets

METHOD FOR SELECTIVELY OBTAINING ANTIOXIDANT RICH EXTRACTS FROM CITRUS FRUITS

FIELD OF THE INVENTION

The present invention generally relates to a method for selectively obtaining antioxidant rich aqueous extracts from citrus fruits. More specifically, the present invention relates to a method for obtaining a balanced enriched composition of simple phenols, polyphenols, bioflavonoids, flavones and flavonones, to control oxidation processes, from citrus aqueous extracts obtained from cells, core, membrane, frit and peels of citrus fruits.

BACKGROUND OF THE INVENTION

Citrus fruits are a growing industry with significant world importance. Citrus fruits (such as lime, lemons, tangerins, oranges and grapefruits) are utilized primarily for juice recovery.

The by-products industry has also a potential for growth since products like terpaneless oils, pectins, alcohol, wine, natural flavors and aromas, and vinegar have also been produced from citrus fruit residues. The peel residue is the primary by-product, amounting to up to 30% of the fruit mass. Cells, core, membrane and frit residues present additional 20% of by-products. In most cases, this huge amount of waste material is the source for cattle feed only, while in other cases products such as molasses, cold-pressed oils, d-limonene, pectin and flavanoids can be extracted and used. Another method for utilization of the by-products stream, practiced in the last decade by few companies, is concentrating the aqueous extract to obtain higher solid extract which may be sold as such, or upgrading the solid extracts, to improve the organoleptic properties by removal of the so called "undesirable compounds" on resin columns.

The protection that fruits and vegetables provide against diseases, including cancer and cardio- and cerebrovascular diseases, has been attributed to the various antioxidants, especially antioxidant vitamins or provitamins, including ascorbic acid and tocopherols. However, the majority of the antioxidative activity of a fruit or a vegetable may be from compounds other than vitamin C, vitamin E, or β-carotene. It was recently demonstrated (Pratt, D. F. and Hudson, B. J. F., "Natural Antioxidants in Foods", Elsevier Applied Science, London (1990), p.171–198) that flavanoids, found in human diets, have also antioxidative activity.

In certain fruits some flavanoids have much stronger antioxidant activities against peroxide radicals than vitamins (vitamin E, vitamin C, glutatione).

Phenolics, in the present invention, are defined as substances possessing an aromatic ring, leaving one or more hydroxyl substituents including their functional derivatives.

The most ubiquitous phenols are polymeric and water-insoluble liquids that are found in vascular plants. However, many of the food phenolics are soluble in water. Phenolics found in feeds generally belong to a subclasses known as phenolic acids, flavonoids, lignans, stilbenes, coumarins and taunins.

When the phenolic skeleton is attached to a sugar glycoside moieties, through an OH group, the materials will be called "glycosyl-flavanoids" or, in short, "flavonoids". The "glycosyl-flavanoids" are more water soluble and have a more complex structure than the phenolic skeleton materials.

In all phenolic compounds in general, and in most flavanoids and flavonoids, there can be found functional phenolic groups capable of quenching radicals or serving as transition metal scavengers. Also, it seems that certain combinations of phenolics exhibit better activities (synergism) than others.

Flavanones and flavanonols are found mainly in citrus fruits. Some citrus flavanones are naringenin, eriodictyol, hesperidin and isosakuranetin. Some of the most common citrus flavanone-glycosides are natrirutin, naringin, hesperedin and neohesperidin.

Citrus fruits consist mainly of 3-deoxy flavanols (differing from flavanols in position 3, flavanols have an hydroxy group) that are termed flavones. Some common flavones are tangeretin, nobitetin and sinensetin.

Simple phenols, (such as cinarnic and limoneic acid), polyphenols and glycosyl-flavanoids are found mainly in the aqueous fraction of the orange, while the flavanones and flavanonols are less water soluble and expected to reside in the "peel oils". (naringin is water soluble whereas naringenin is more "oil soluble").

Today's world is very aware of the health benefits offered by citrus fruits in terms of vitamins and other additives, and the consumption of citrus juice and drinks is increasing dramatically every year.

Naringin (in grapefruits) and hesperidin (in oranges) are the two major flavanoid-glycosides present in the citrus fruits, and are primarily concentrated in the peel and the tissue of the fruit. Attempts were made to extract and purify both flavanoids (Braddock, R. J., By-products of citrus fruit, Food Technology, 9,1995 p.74–77), but the anti oxidation capacity of orange, grapefruit, or any other specific citrus extracts, was not explored. Furthermore, no data is available regarding fractionation and enrichment of the possible active matter (bioflavonoides and/or simple and polyphenols) in each of the fruit fractions (cells, core, frit and peels). The existing debittering technology relates to recovery of bioflavenoids only (mainly naringin and hesperidin), by method of alkaline water extraction utilizing caustic solutions for pH control.

The present existing technologies are based on absorption/adsorption and resin extraction, and the removal/recovery of the products are not selectively done. Moreover, the alkaline conditions could change chemical structures, mainly by hydrolyzing the ester bonds between the sugars and the flavonoids and partially oxidizing the phenolic groups. In addition, the existing technology encounters environmental hazards.

Various attempts were made to obtain antioxidant materials from fruits. DE patent No. 2525590 teaches a process for obtaining, via solvent extraction of oil a non-specific segment, which contain (among other compounds) some bioflavonoids. However, DE patent No. 2525590 relates only to the oily phase of the citrus fruit and not to the aqueous (juice) fraction. EP patent No. 657169 describes a method for obtaining a fruit polyphenol from unripe fruits of Rosaceae by subjecting the unripe fruits of Rosaceae to pressing and/or extraction and then purifying the resulting juice or extract. However the invention relates only to the unripe fruits of Rosaceae and not to citrus fruits. Hence, the polyphenols obtained are of different structures and properties.

Up to this date no direct correlation between each of the above phenolic compounds in citrus fruits to their "antioxidant activity" was shown.

In the present invention it is shown, for the first time, that the composition of certain polyphenols, simple phenols and/or flavones and/or flavanoids derived from citrus fruit, can offer, in themselves and combined with each other, antioxidant capacities that are more attractive than many known synthetic or natural antioxidants from common vegetables or fruits.

As opposed to the work done up to this date, the present invention relates to an environment friendly method for selectively extracting unique and well-balanced synergistic compositions of phenolics (combinations of simple phenols, polyphenols and flavonoids) from citrus fruits, that exhibit strong antioxidant capacities, superior to the isolated flavanoids such as naringin or herperidin.

The method of the present invention also differs from the work done up to date in that, otherwise discarded compounds ("undesirable compounds"), are eluted from the resin, allowing for the possibility, during the elution process, to selectively enrich each of the fractions by its active matter. This additional elution step gives a significant advantage over the alkaline or acidic "water extracted fractions" of the methods used today, being "blind" to their internal product distribution and activity.

The present technology offers the additional advantage of selectivity of extraction/recovery by utilizing advanced citrus down stream engineering based on chromatographic selective separation that was not applied for the purpose of obtaining a selective, rich in antioxidants, extract from citrus fruits, in any of the present/known technologies.

SUMMARY OF THE INVENTION

The present invention relates to a method for selectively obtaining antioxidant rich aqueous extracts from the cells, frit, core, and peels of citrus fruits, comprising;

employing water treatment and solids extraction of the citrus fruit;

employing separation technology and/or membrane technology on the said extracts, resulting in a serum;

submitting said serum to an adsorption process on resin, preferably in columns preconditioned by passing deionized water through the column, and charging the columns with solvents, preferably an edible solvents such as ethanol, isopropanol or ethyl acetate, wherein the solvent to resin volume ratio is between 1:1 to 10:1; and eluting the adsorbed antioxidant compounds from the resin by solvents, preferably edible solvents such as ethanol or ethyl acetate, and collecting the solvent. For selectivity purposes the solvent may be collected fraction-wise.

The resin column may be further charged with other blends or combinations of solvents and another selective fraction or fractions may be further collected.

The collected solvent fractions may be further evaporated to obtain dry phenolic compounds.

In the method of the present invention antioxidant rich extracts are obtained selectively. This selectivity is achieved by collecting the fractions according to charged solvent sequence or polarity of charged solvent or the flow rate of the charged solvent or the hydrophobic hydrophilic attraction to the resin.

The present invention further relates to selectively obtained antioxidant rich extracts from citrus fruits obtained by said method, and compositions containing them. These compositions contain specific simple phenols, polyphenols, flavones and flavonones and bioflavanoids such as naringenin, eriodictyol, hesperedin, isosakuranetin, and the corresponding bioflavonoids such as narirutin, naringin, hesperedin, neohesperidin, tangeretin, nobiletin and sinensetin, or blends of simple phenols such as limonin, nomelin, cinamic acid as well as polyphenols and Vitamin C, or mixtures thereof which work in synergism to provide superior health benefits.

Preferably, in the compositions of the present invention, the total polyphenols and phenols exceeds 30%, and the ratio of total polyphenols and phenols to bio-flavonoids is from approximately 1:3 to approximately 3:1.

BRIEF DESCRIPTION OF THE DRAWINGS

The present invention is illustrated by way of example, and not by limitation, in the figures of the accompanying drawings, wherein the elements having the same reference numeral designations represent like elements throughout and wherein.

DETAILED DESCRIPTION OF THE INVENTION

The present invention relates to a method for selectively obtaining antioxidant rich extracts from citrus fruits. In general, the said method comprises the following steps:

(1) Extensive water treatment and solid extraction (water, acidic or neutral, co-current or counter-current), followed by (2) utilization of separation technology (presses and/or finishers and/or decanters and/or other filter centrifuges—any of the above or combinations thereof) and/or membrane technology (microfiltration, ultrafiltration and nanofiltration—any of the above or combination), resulting in serum, followed by (3) an adsorption process (by physical or chemical hydrophilic/hydrophobic interaction), carried out on columns packed with carefully selected edible polymeric adsorbent (or by direct contact with the adsorbent other than on columns). (4) Regeneration of the adsorbed matter which builds up on the resin columns (or the adsorbent). The active matter in the present invention is known also in the citrus industry as "undesirable compounds" but is, in fact, high potent active materials. The adsorbed matter is extracted (removed) from the columns by edible solvents to obtain a blend enriched in phenolic compounds (also referred to as RSPP-rich specific phenols and/or RSBF-rich specific bioflavonoids). The blends include balanced compositions of phenolic acids, polyphenols and bioflavonoids.

The method of the present invention allows for control over the internal product composition balance between simple and polyphenol flavanoids and flavonoids. This control is achieved by collecting the fractions according to hydrophobi\hydrophilic attraction to the resin and the polarity of the solvent.

In the method of the present invention, the existing practice of resin treatment (which is characterized by extensive washing of columns with caustic soda and corrosive acids resulting in severe effluent problems and significant reduction of the absorption capacity of the resin), is replaced by passing either edible or non edible solvents (edible solvents such as alcohols, aldehyds, ketons, acids, esters, or any combination thereof, and the non edible solvents such as DMSO, DMA, DMF and dioxane or any combination thereof) through the columns, collection of fractions of the column effluent and optionally evaporation of the solvent from the collected fractions to obtain dry RSPP mixtures and recycled solvent available for the next treatment. The ratio of solvent to resin volume may vary from 1:1 to 10:1 and the solvent is charged to the top of the column drop-wise at a rate of 0.5 to 4.0 BV (bed volume) per hour. The RSPP fractions differ according to their hydrophobic/hydrophilic attraction to the resin and the polarity of the solvent.

Figure 1A:
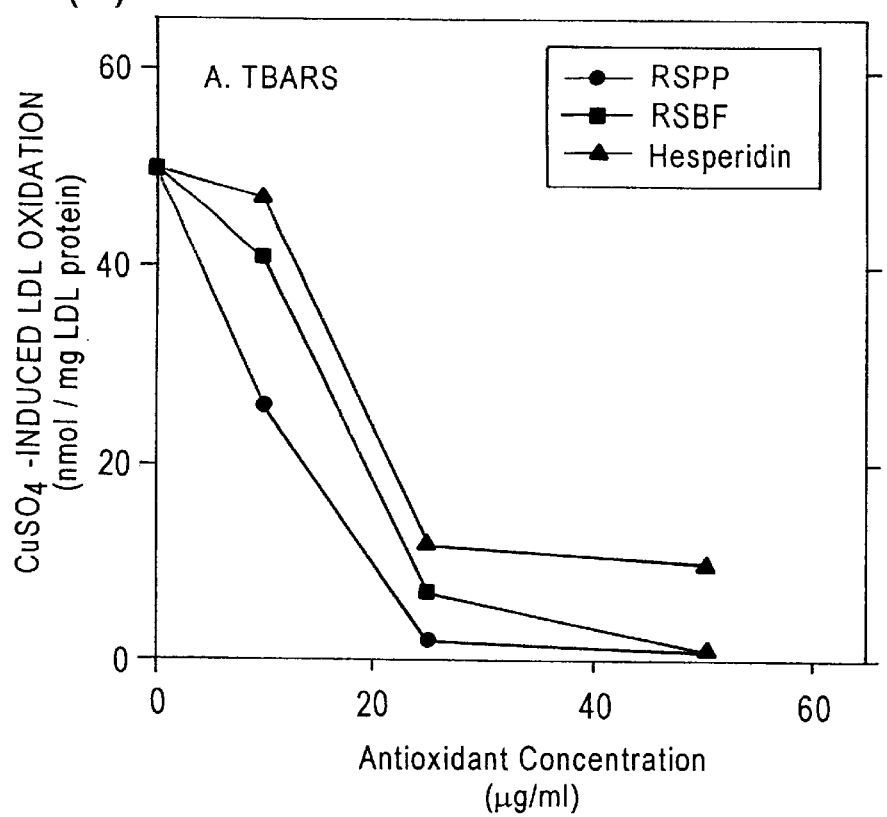
FIGS. 1(A) and 1(B) are graphs presenting copper-ion-induced LDL oxidation as a function of antioxidant concentration to show anti-oxidative capacity of RSPP, RSBF and Hesperidin.
Figure 1B:
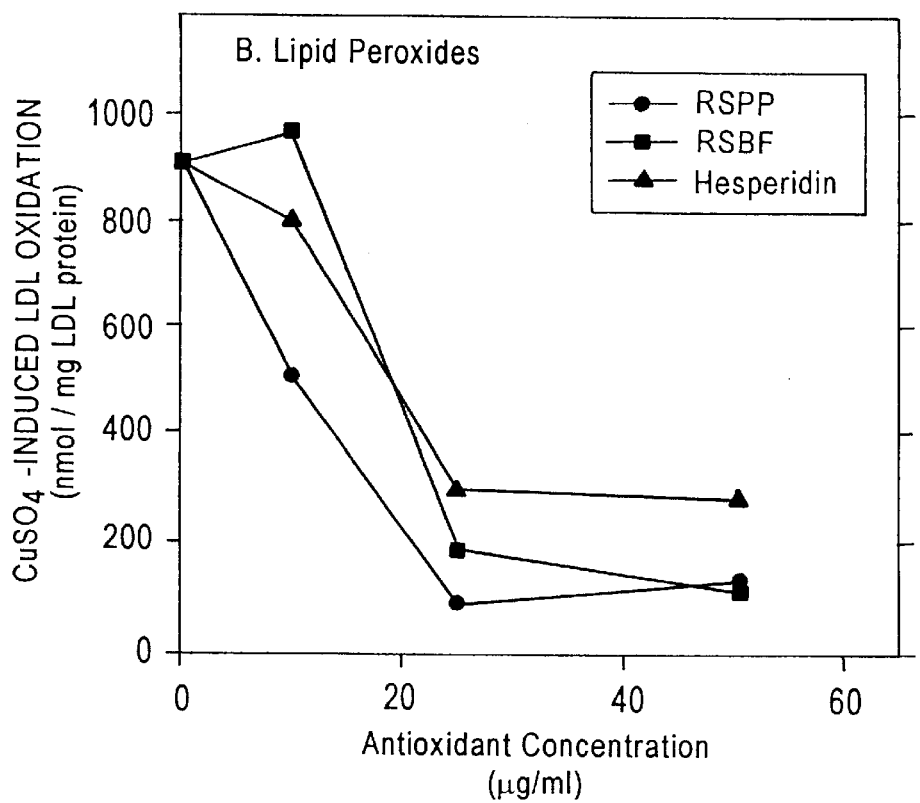

The RSPP blend, extracted by the method of the present invention (termed rich specific phenols and includes nonglycosides, simple phenols and polyphenols which are esterified; non-bioflavanoid compounds), has maximum antioxidative capacity exhibited on copper-ion-induced LDL oxidation (FIG. 1).

Figure 2:
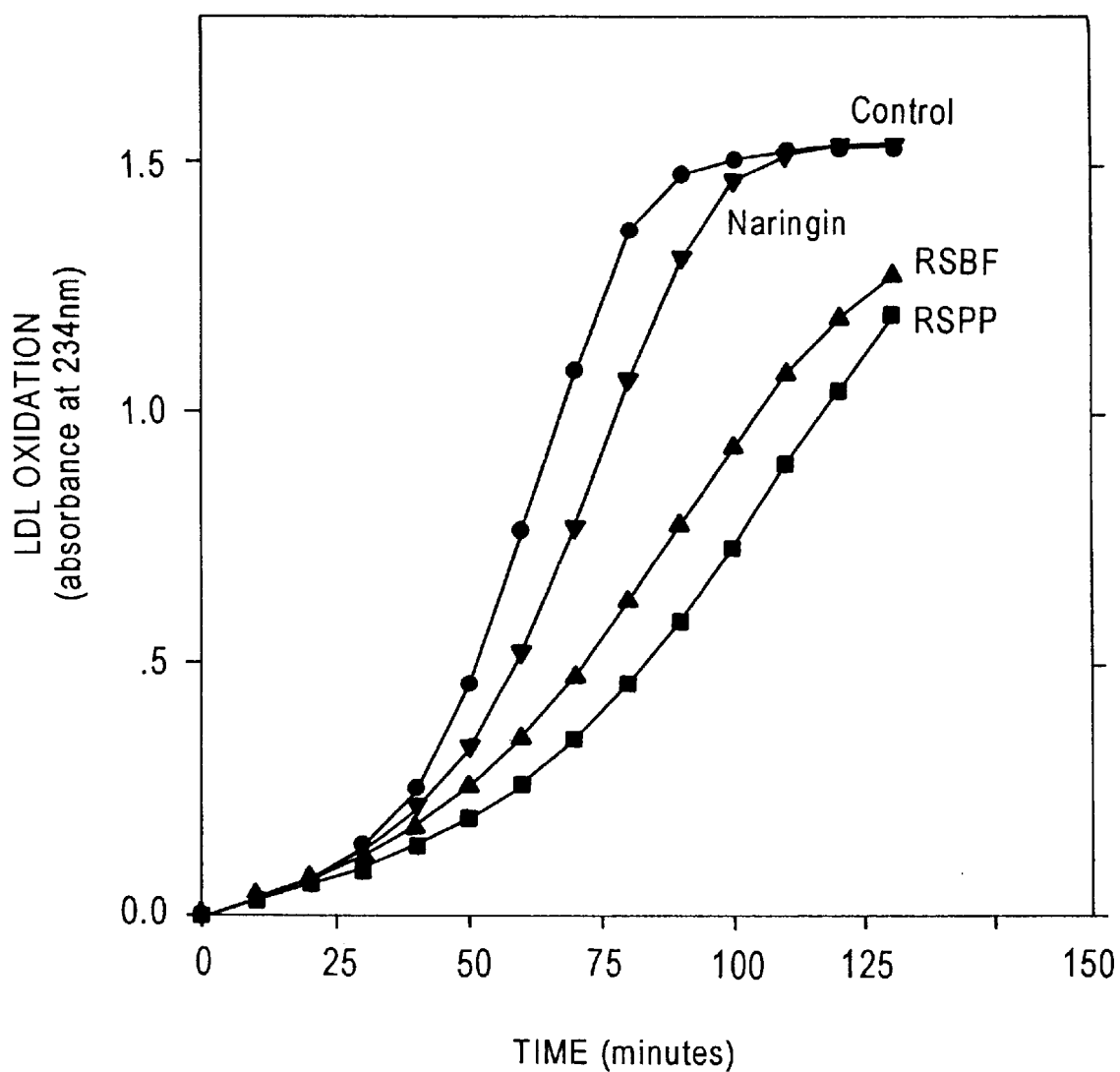
FIG. 2 is a graph presenting LDL oxidation as a function of time for RSPP, RSBF and Naringin.
Figure 3:
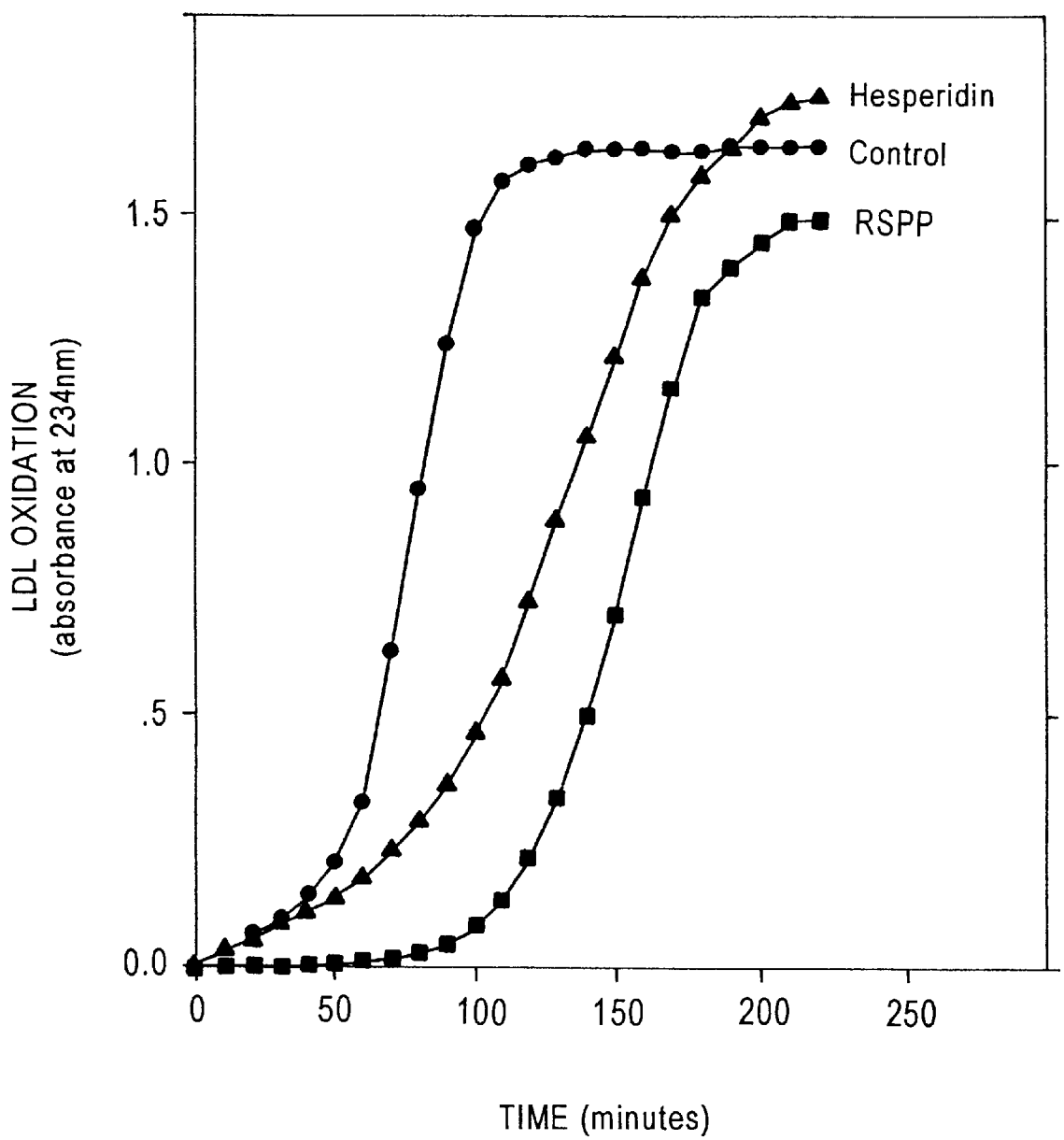
FIG. 3 is a graph presenting LDL oxidation as a function of time for RSPP and Hesperidin.
Figure 4A:
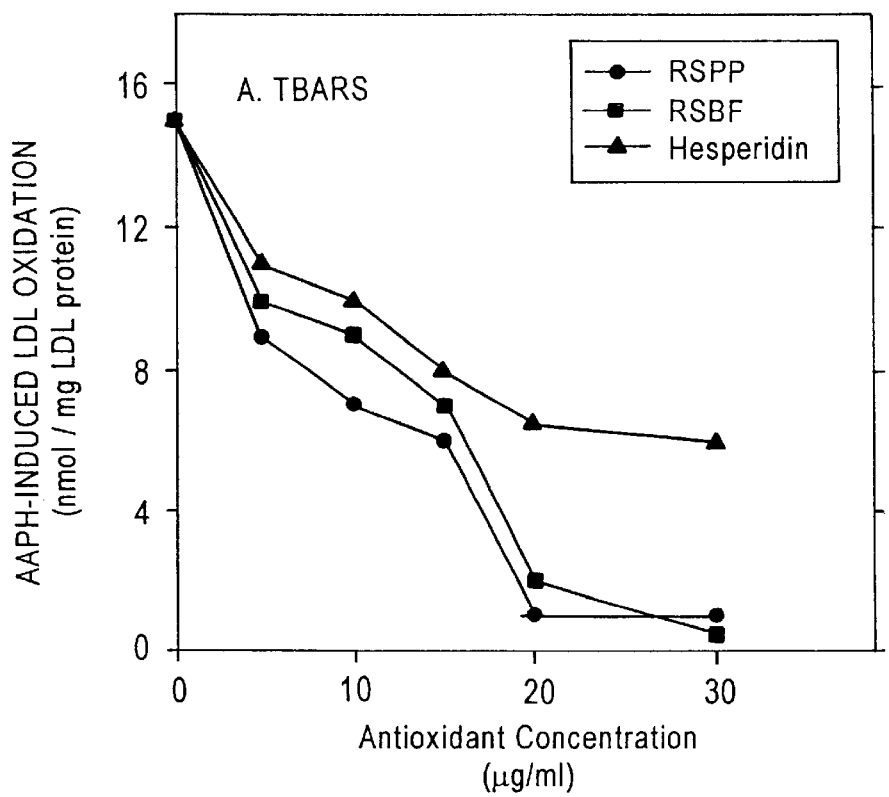
FIGS. 4(A) and 4(B) are graphs presenting AAPH-induced LDL oxidation as a function of antioxidant concentration to show anti-oxidant capacity of RSPP, RSBF and Hesperidin.
Figure 4B:
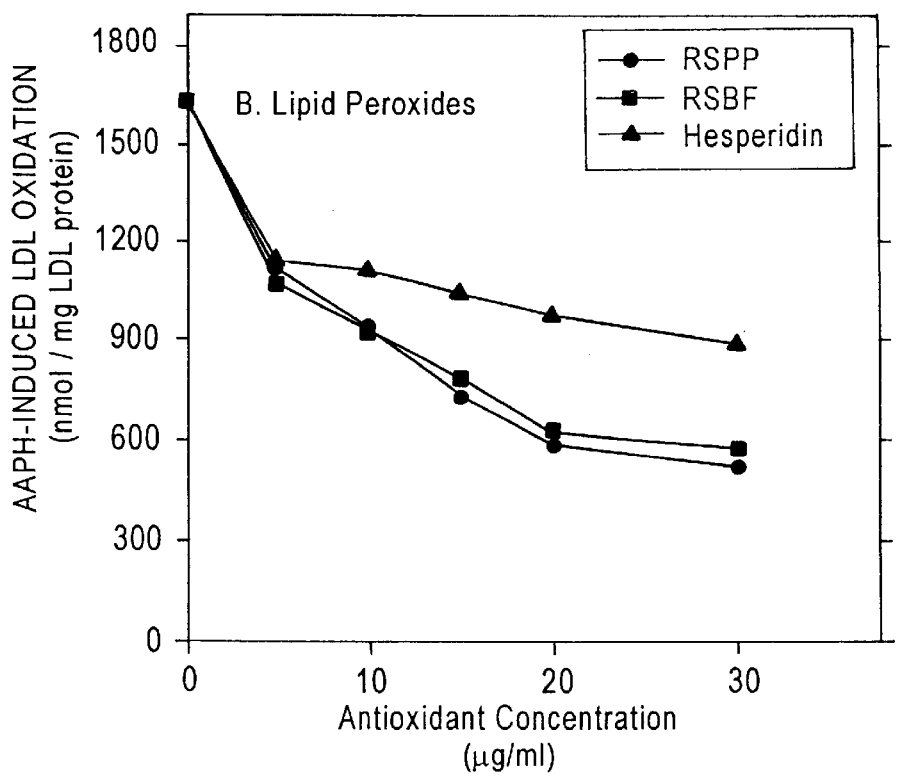
Figure 5A:
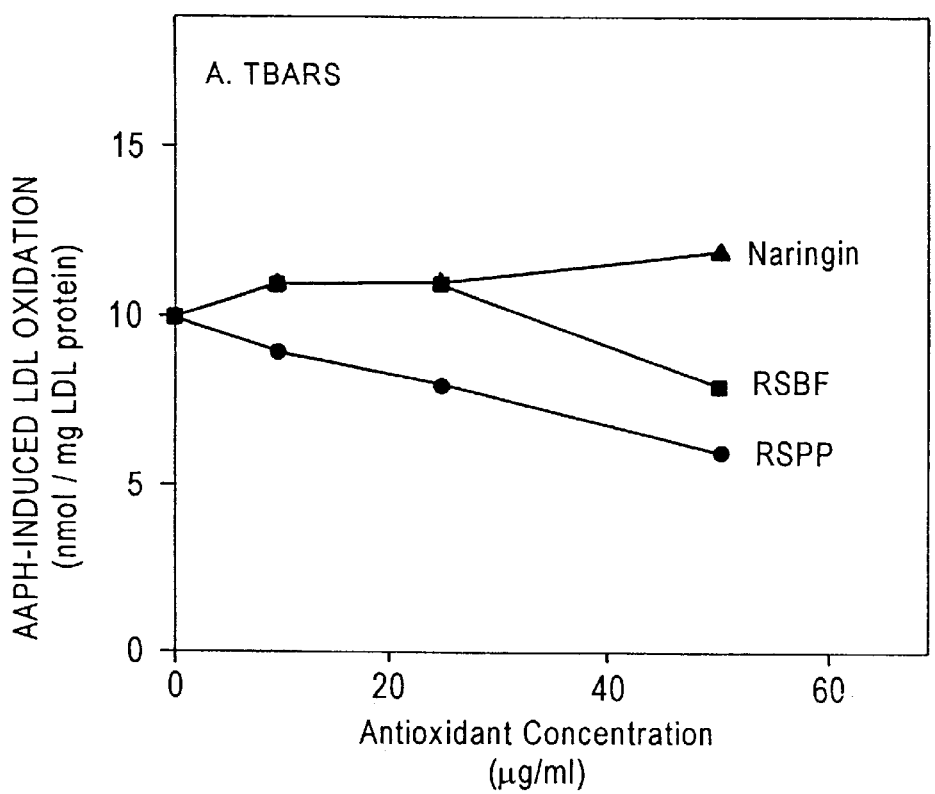
FIGS. 5(A) and 5(B) are graphs presenting AAPH-induced LDL oxidation as a function of antioxidannt concentration to show anti-oxidative capacity of RSPP, RSBF and Naringin.
Figure 5B:
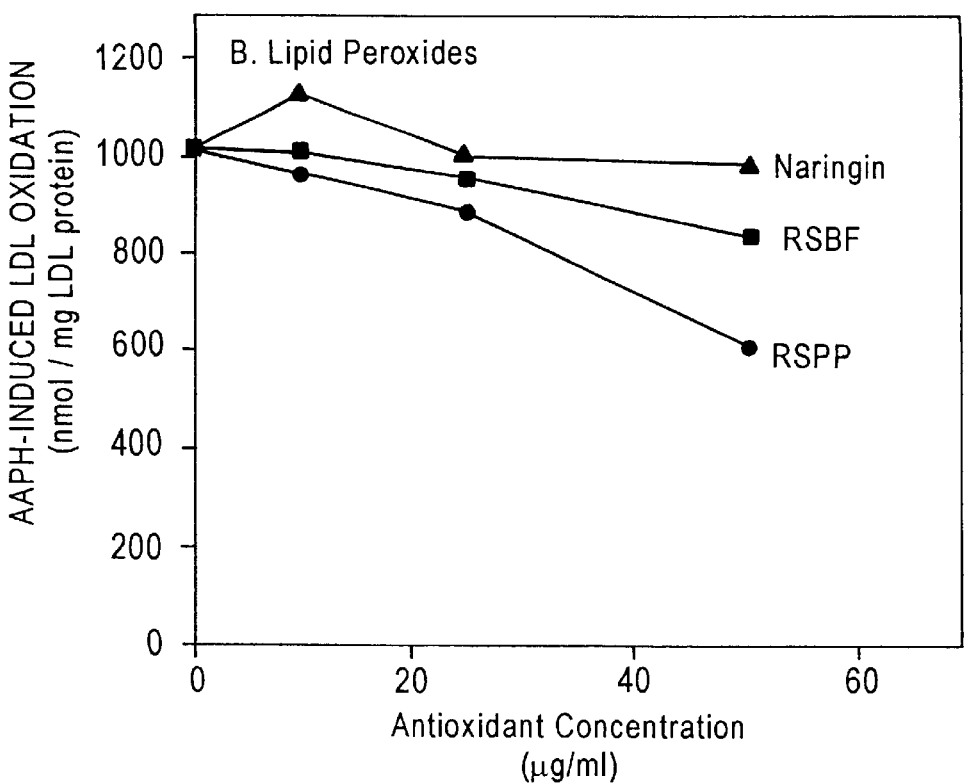

The method of the present invention allows for selective extraction of fractions rich in polyphenols, more than fractions in which the flavonoids are in lower concentration and markedly more than pure hesperidin or naringin (FIGS. 2,3—as a function of time). The selective extraction products have antioxidant capacity to induce also the AAPH-LDL oxidation markedly more than pure hesperidin or naringin and more than commercial blends of citrus bioflavonoids.(FIGS. 4,5 and table 1). This advantage is maintained also for combined antioxidant systems where the RSPP is blended with Vitamin C and compared to commercially available products (table 1).

Figure 6:
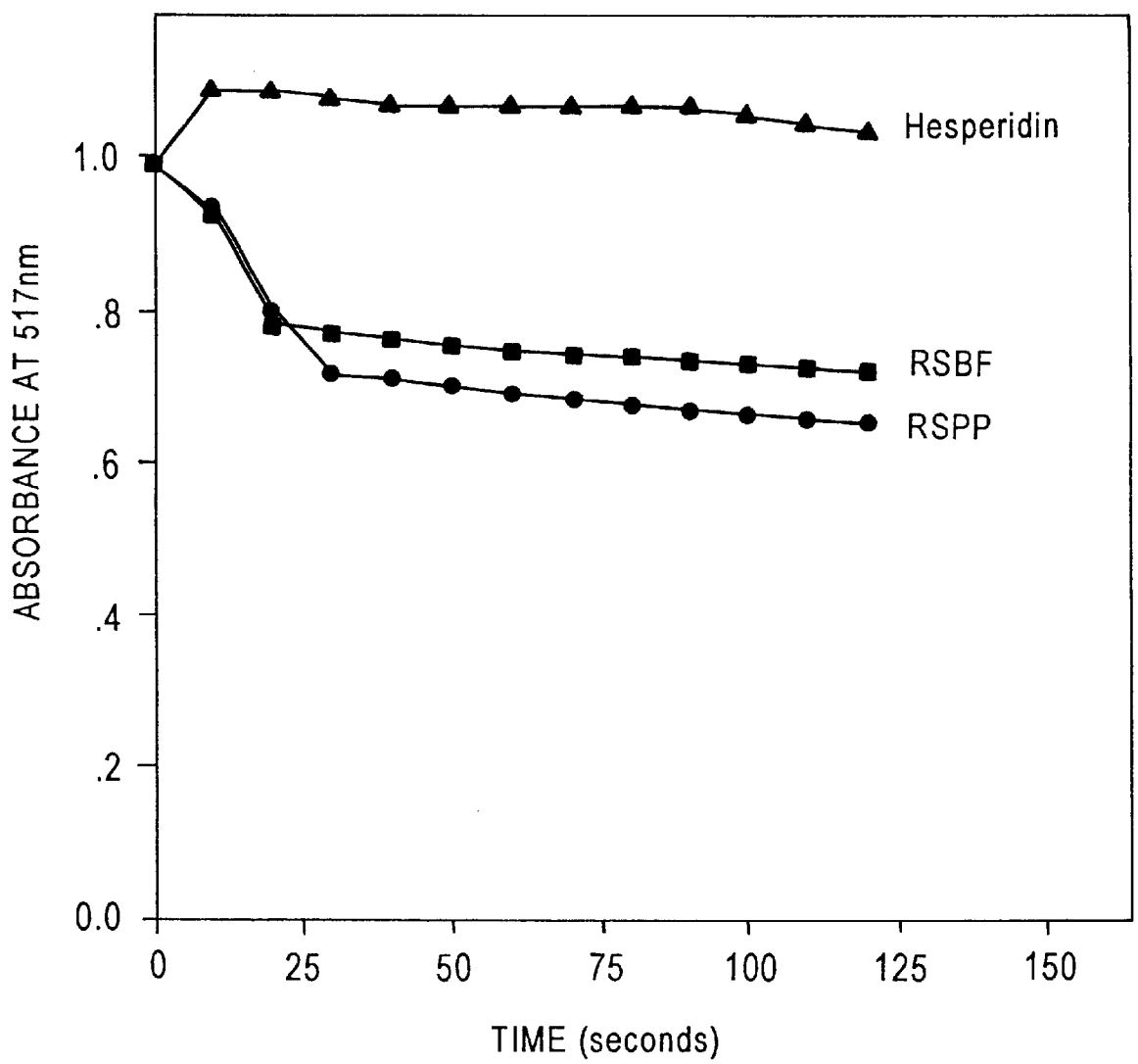
FIG. 6 is a graph showing radical scavenging capacity, as function of time, of RSPP, RSBF and Hesperidin.

Similar trends have been detected by an additional method describing the radical scavenging capacity of the active extract as a function of time, as is shown in FIG. 6 (vs the hesperidin).

The advantages of the method of the present invention are that this method:

permits good control over the internal product composition so that the extracted matter will be rich in polyphenols or rich in flavonoids, according to the antioxidation requirements.

achieves antioxidation capacity of the active matter which is superior to pure hesperidin and/or naringin.

permits to extract active matter to act primarily as $Cu^{++}$ scavenger or peroxide radical quencher. The fraction, rich in polyphenols, will act as a metal scavenger.

achieves antioxidant activities against peroxide radical ($ORAC_{ROO}$ activity) that are better than many other vegetable extracts and that are controlled by the extraction process.

regenerates resin columns without utilization of strong bases or acids.

The said invention will be further illustrated by the following examples. These examples do not intend to limit the scope of the invention but to demonstrate and clarify it only.

EXAMPLES

In the following examples citrus fruit extraction discharge was treated according to commonly practiced processes and the final steps of regeneration of the high potent active materials, which build up on the resin, were by using solvents for elution according to the present invention. The columns used for resin treatment were packed with polymeric adsorbent commercially available from Rohm and Haas of the type AMBERLITE XAD 16. After the column in which the resin treatment is carried reached saturation, preconditioning of the column was carried out, wherein deionized water at 80° C. was passed through the column at flow rate of 4 BV/hour during 1 hour. Ethanol or ethyl acetate was charged to the column dropwise from the top at a rate of 0.5 to 4.0 BV/hour. The eluant was collected fraction-wise.

Example 1

5 liters of discharge-stream made from core, membrane, frit and peel of Valencia orange fruit at I OBx concentration, were pumped by peristaltic pump through glass column packed with 250 ml resin at a rate of 2–3 BV/hr. The column was then charged with 1 liter of 96% ethanol at a rate of 2 Bv/hr and left overnight. The feeding with ethanol was continued the next day at a rate of 0.5 BV/hr for 2 hours and 0.25 liter ethanol extract were collected (fraction A).

The flow rate was increased to 2 BV/hour and additional 2 Liters of ethanol extract were collected during 4 hours (fraction B). The flow rate was increased to 3 BV/hr and additional 2.2 liters were collected during 3 hours (fraction C).

Fraction A was evaporated yielding 1.35 gr of dark material determined as caramelized sugars.

Fraction B yielded 11 gr of orange colored powdered material (defined as RSPP). The total bioflavonoid content of this RSPP was 52% determined by a spectrophotometric method, and expressed as hesperidin. The total polyphenols content (expressed as tannic acid) was 19.3%. The simple phenols (as cinamic and benzoic acids) were 28%. Therefore the total content of phenols and polyphenols was 47.3%.

Fraction C yielded 4.7 gr of yellow colored powder (defined as RSBF). The total bioflavenoid content of this RSBFo was 65%, and total polyphenols 21.1%. Simple phenols content in this sample was 14%, hence the total phenols and polyphenols was 35.1%.

It is therefore seen that the total active matter (phenols and polyphenols), that are non-bioflavonoids is higher in concentration in the so-called RSPP (48%), Vs the so-called RSBF (35%).

Example 2

6 liters of discharge stream made from core, membrane, frit and peel of grapefruit juice (untreated for removal of naringin), at 11 Bx concentration were pumped by peristaltic pump through glass column packed with 250 ml resin at a rate of 2–3 BV/hr. The column was then charged with 1 liter of 96% ethanol at a rate of 2 Bv/hr and left overnight. The feeding with ethanol was continued the next day at a rate of 0.5 BV/hr for 2 hours and 0.25 liter ethanol extract were collected (fraction A). The flow rate was increased to 2 BV/hour and additional 2 liters of ethanol extract were collected during 4 hours (fraction B). The flow rate was increased to 4 Bv/hr and additional 2 liters were collected during 2 hours (fraction C).

Fraction A was evaporated yielding 2.5 gr of dark material determined as caramelized sugars.

Fraction B yielded 14 gr of brown-yellow colored powdered material (defined as RSPPg). The total bioflavonoid content of this RSPPg was 56% determined by spectrophotometric methods and expressed as naringin, and the total polyphenols expressed as tannic acid was 18.0%. Simple phenols were determined as 22.5%.

Fraction C yielded 6.4 gr of pale yellow powder (defined as RSBFg). The total bioflavenoid content of this RSBFg was 63%, and total polyphenols 20.7%. Simple phenols were determined as 12.9%.

Example 3

The procedure in example 1 was repeated in a column packed with 1000 ml of resin. The yields in all 3 fractions differed by ±3% than expected from the results in example 1, and the determined total bioflavenoids and total polyphenols varied by ±5% from values determined for example 1. The column was then further washed with ethyl acetate for 3 hours in flow rate of 1.5 BV/hr. Additional 6.2 gr of powder were received upon evaporation of the collected ethyl acetate solution. The bioflavenoid content of this powder was 64% and total polyphenols 16.9%.

TABLE NO. 1

Comparison of The Antioxidative Capacity of Various Polyphenol Preparations Added to Blood Serum (10 mg/L), and Exposed to Oxidation by Copper Ion

| Preparation | [e]OD 245 (at 300 min) | [f]t max (min) | t max/t max$_o$ |
|---|---|---|---|
| Control | 0.300 | 42 | 1.00 |
| [a]RSPPo | 0.262 | 54 | 1.29 |
| [b]commercial BF #1 | 0.257 | 45 | 1.07 |
| RSPPo: Vit C blend (4:6) | 0.319 | 198 | 4.71 |
| [c]commercial blend #2 | 0.257 | 177 | 4.21 |
| [d]commercial blend #3 | 0.278 | 51 | 1.00 |

[a]RSPPo is rich specific polyphenols extract from oranges (Fraction B).
[b]commercial BF #1 is a bioflavonoid (BF) product available commercially from SOLGAR ® under the name R.H.C. factors 1000 plus.
[c]commercial blend #2 is SOLGAR ® citrus bioflavonoids 1000, blended 4 parts with 6 parts of Vitamin C.
[d]commercial blend #3 is a bioflavonoid product, produced by SYN-ERGY ® and contains bioflavonoids and Vitamin C in a ratio of 4 to 6.
[e]OD 245 is Optical Density measured at 245 nm.
[f]t max is the time course of the maximum change in the Optical Density.

What is claimed is:

1. A method for obtaining a selective extract, rich in antioxidants, from citrus fruits, comprising;
   a. employing aqueous based extraction of the citrus fruit;
   b. employing separation technology on the said extracts, resulting in a serum, said separation technology comprises the use of presses, finishers, decanters and other filter centrifuges and membrane technology comprising the use of at least one of the following; microfiltration, ultrafiltration, nanofiltration centrifuges, evaporators and turbo filters or any combination thereof;
   c. submitting said serum to an adsorption process on resin and
   d. eluting the adsorbed said antioxidant compounds from the resin, either in one fraction or fractionwise, to obtain specificity.

2. A method according to claim 1 wherein the aqueous extraction is applied to at least one of the following component of the citrus fruit; the cells, frit, core, or peels.

3. A method according to claim 1 wherein the aqueous extraction is co-current or counter-current, at approximately 10 Bx concentration.

4. A method according to claim 1 wherein the resin is a preconditioned polymeric adsorbent.

5. A method according to claim 4 wherein the polymeric adsorbent is packed in a column and the preconditioning is by passing water through the column, and charging the column with water miscible solvents.

6. A method according to claim 5 wherein, the water is passed through the resin column at a flow rate of approximately 4 bed volume/hour and the column is charged with solvents at a rate of approximately 0.5–4.0 bed volume/hour.

7. A method according to claim 5 wherein the solvent to resin volume ratio is between 2:1 to 10:1.

8. A method according to claim 1 wherein eluting the adsorbed compounds from the resin comprises passing the extract from the citrus fruit through the resin and subsequently charging the resin with a solvent and collecting the solvent.

9. A method according to claim 8 wherein the solvent is collected fraction-wise.

10. A method according to claim 8 wherein the aqueous extract is passed through the resin at a rate of approximately 2–3 bed volume/hour and the solvent is charged at a rate of approximately 2 bed volume/hour.

11. A method according to claim 8 wherein the resin is further washed with ethanol, ethyl acetate or a mixture thereof and a fraction or fractions are collected.

12. A method according to claim 8 wherein the collected solvent fractions are further evaporated to obtain dry mixtures consisting of citrus compositions and phenolic compounds.

13. A method according to claim 1 wherein the solvents are either edible or non edible solvents.

14. A method according to claim 13 wherein the edible solvents are selected from the groups of alcohols, aldehyds, ketons, acids, esters, or any combination thereof, and the non edible solvents are selected from DMSO, DMA, DMF and dioxane or any combination thereof.

15. A method according to claim 1 wherein selectivity in obtaining aqueous extracts rich in antioxidants is achieved by collecting the fraction or fractions according to charged solvent sequence or polarity of charged solvent or the flow rate of the charged solvent or the hydrophobic\hydrophilic absorption or affinity to the resin.

16. A method according to claim 15 wherein the obtained antioxidant rich aqueous extract is a selective composition.

17. A method according to claim 16 wherein the obtained antioxidant rich aqueous extract is a selective composition of polyphenols and bio-flavonoids.

18. A method according to claim 17 wherein the polyphenols and bioflavonoids are phenols, polyphenols, flavones and flavonones.

19. A method according to claim 18 wherein the phenols, polyphenols, flavones and flavonones are selected from; naringenin, eriodictyol, hesperidin, isosakuranetin, natrirutin, naringin, hesperedin, neohesperidin, tangeretin, nobitetin and sinensetin.

20. A method of obtaining a selective extract that is rich in antioxidants from citrus fruits, said method comprising the steps of:
   a) providing an aqueous based extraction of the citrus fruits;
   b) preparing a serum, employing separation technology on the extraction, said separation technology is membrane technology comprising the use of at least one of microfiltration, ultrafiltration, nanofiltration centrifuges, evaporators and turbo filters, or any combination thereof;
   c) submitting said serum to an adsorption process on resin; and
   d) eluting, either in one fraction or fractionwise, adsorbed matter built up on the resin, said adsorbed matter containing said antioxidants, to obtain said selective extract.

21. The method of claim 20, wherein said steps a), b), c) and d) are implemented so as to preserve polyphenols and bio-flavonoids, which are naturally contained in the citrus fruits, in said selective extract.

22. The method of claim 20, wherein said aqueous based extraction is prepared from citrus fruit residues remained after a juice recovery process of the citrus fruits.

* * * * *